(12) United States Patent
Yang et al.

(10) Patent No.: US 11,841,724 B2
(45) Date of Patent: Dec. 12, 2023

(54) MLPE PHOTOVOLTAIC SYSTEM AND METHOD FOR PHOTOVOLTAIC STRING CONTROL IN MLPE PHOTOVOLTAIC SYSTEM

(71) Applicant: Sungrow Power Supply Co., Ltd., Hefei (CN)

(72) Inventors: Yu Yang, Hefei (CN); Yuqi Peng, Hefei (CN); Jun Xu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 17/519,659

(22) Filed: Nov. 5, 2021

(65) Prior Publication Data

US 2022/0147090 A1    May 12, 2022

(30) Foreign Application Priority Data

Nov. 11, 2020 (CN) .......................... 202011252428.7

(51) Int. Cl.
| | | |
|---|---|---|
| *G05F 1/67* | (2006.01) | |
| *G05F 1/06* | (2006.01) | |
| *G05F 1/573* | (2006.01) | |

(52) U.S. Cl.
CPC .............. *G05F 1/06* (2013.01); *G05F 1/5735* (2013.01)

(58) Field of Classification Search
CPC ........ G05F 1/569; G05F 1/573; G05F 1/5735; G05F 1/66; G05F 1/67; Y02E 10/50;
(Continued)

(56) References Cited

U.S. PATENT DOCUMENTS 10,367,357 B2 * 7/2019 Cunningham .......... H02S 40/34
2012/0139347 A1 * 6/2012 Hackenberg ............ H02M 7/42
307/71
(Continued)

FOREIGN PATENT DOCUMENTS

CN  102291052 A  12/2011
CN  104538987 A   4/2015
(Continued)

OTHER PUBLICATIONS

English translation JP6537723. (Year: 2019).*
(Continued)

*Primary Examiner* — Thienvu V Tran
*Assistant Examiner* — Carlos O Rivera-Perez
(74) *Attorney, Agent, or Firm* — Wolf, Greenfield & Sacks, P.C.

(57) ABSTRACT

A module level power electronics (MLPE) photovoltaic system and a method for photovoltaic string control are provided. The method is applied to a control unit in the MLPE photovoltaic system. The control unit detects an output current of each photovoltaic string in the MLPE photovoltaic system, and then controls, for photovoltaic strings connected in parallel to a same inverter in the MLPE photovoltaic system, a voltage of a photovoltaic string with larger output current to be reduced, or controls a voltage of a photovoltaic string with smaller output current to be increased, so that backflow current can be reduced to preset range tolerable for MLPE device. The method is from a perspective of the MLPE photovoltaic system, the backflow current is limited by controlling voltage change of associated photovoltaic string without additional hardware cost, effectively protecting MLPE device in the MLPE photovoltaic system.

16 Claims, 8 Drawing Sheets

(58) Field of Classification Search
CPC ........... Y02E 10/56; H02M 3/02; H02M 3/04;
H02M 3/10; H02M 3/145; H02M 3/155;
H02M 3/156; H02M 3/158; H02M
3/1584; H02M 1/0009; H02M 1/0067;
H02M 1/007; H02M 1/0077; H02M 1/32;
H02J 3/381–385
USPC ........ 323/259, 271–278, 282–285, 351, 906,
323/371; 363/50–58, 65–72; 361/78, 84,
361/86, 87, 93.1–101; 307/71, 77, 78,
307/82, 84, 85
See application file for complete search history.

(56) References Cited

U.S. PATENT DOCUMENTS

| | | |
|---|---|---|
| 2014/0103891 A1 | 4/2014 | Stratakos et al. |
| 2014/0159763 A1 | 6/2014 | Luo et al. |
| 2014/0239725 A1 | 8/2014 | Easwaran et al. |
| 2014/0252860 A1 | 9/2014 | Puukko et al. |
| 2016/0190811 A1 | 6/2016 | Pan et al. |
| 2018/0219394 A1* | 8/2018 | Tomita .................. G01R 31/40 |
| 2019/0123567 A1* | 4/2019 | Kaneko ..................... H02J 7/00 |
| 2022/0294361 A1* | 9/2022 | Xu .......................... H02M 7/48 |

FOREIGN PATENT DOCUMENTS

| | | |
|---|---|---|
| CN | 204794878 U | 11/2015 |
| CN | 107508463 A | 12/2017 |
| CN | 2018-124166 A | 8/2018 |
| CN | 110198073 A | 9/2019 |
| CN | 110888085 A | 3/2020 |
| EP | 3 629 439 A1 | 4/2020 |
| JP | 2013-501495 A | 1/2013 |
| JP | 2015-532983 A | 2/2016 |
| JP | 2016-506227 A | 2/2016 |
| JP | 6537723 B2 | 7/2019 |
| JP | 2010-521720 A | 6/2022 |

OTHER PUBLICATIONS

Extended European Search Report for European Application No. 21203608.1, dated Apr. 13, 2022.
First Office Action for Japanese Application No. 2021-181219, dated Oct. 3, 2022.

* cited by examiner

MLPE PHOTOVOLTAIC SYSTEM AND METHOD FOR PHOTOVOLTAIC STRING CONTROL IN MLPE PHOTOVOLTAIC SYSTEM

CROSS REFERENCE OF RELATED APPLICATION

The present application claims the priority to Chinese Patent Application No. 202011252428.7, titled "MLPE PHOTOVOLTAIC SYSTEM AND METHOD FOR PHOTOVOLTAIC STRING CONTROL IN MLPE PHOTOVOLTAIC SYSTEM", filed on Nov. 11, 2020 with the China National Intellectual Property Administration (CNIPA), which is incorporated herein by reference in its entirety.

FIELD

The present disclosure relates to the technical field of photovoltaic power generation, and in particular to a module level power electronics (MLPE) photovoltaic system and a method for photovoltaic string control in the MLPE photovoltaic system.

BACKGROUND

Figure 1:
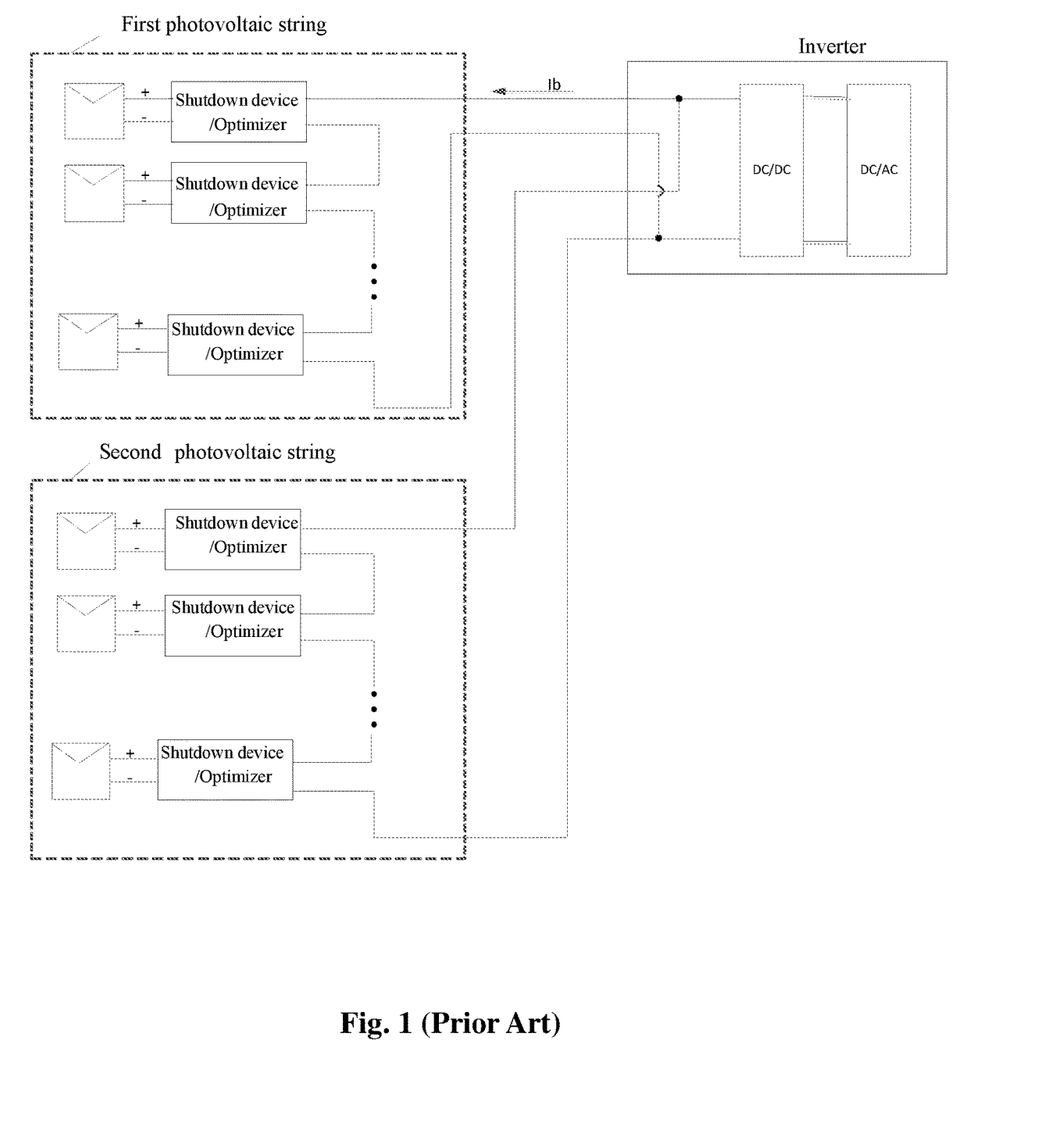
FIG. 1 is a schematic structural diagram of a photovoltaic system provided with a MLPE device according to the conventional technology.

In conventional technology, as shown in FIG. 1, output ends of two (such as, a first photovoltaic string and a second photovoltaic string as shown in FIG. 1) or more (not shown) photovoltaic strings are usually connected in parallel to an inverter in a photovoltaic system. Therefore, in a case that one photovoltaic string in the photovoltaic system is abnormal, a normal photovoltaic string generates a backflow current to flow into the abnormal photovoltaic string. The abnormity of the photovoltaic string commonly includes the number of photovoltaic modules in the photovoltaic string being less, some photovoltaic modules being covered by shadow, failed photovoltaic module(s), shutdown device or optimizer corresponding to some photovoltaic modules being in an output-limited state, and the like.

For example, as shown in FIG. 1, if the first photovoltaic string is in an abnormal operation state, the second photovoltaic string in a normal operation state generates a backflow current (such as the current Ib as shown in FIG. 1) to flow into the first photovoltaic string.

Commonly, the photovoltaic module has a stronger ability to withstand the backflow current, so that even if the backflow current flows into the photovoltaic module, the photovoltaic module is not damaged. However, with the popularization of module level power electronics (MLPE) devices, the number of photovoltaic systems provided with the MLPE devices (such as the shutdown device/optimizer as shown in FIG. 1) increases. The MLPE device has a weaker ability to withstand the backflow current. In extreme cases, the backflow current being 30 percent of a rated current causes damage of the MLPE device. Therefore, the riskless backflow current for a photovoltaic system without the MLPE device is a potential risk for the MLPE photovoltaic system. It is urgently required an effective method for limiting the backflow current of the photovoltaic string, to protect the MLPE device in the MLPE photovoltaic system.

SUMMARY

In view of this, a module level power electronics (MLPE) photovoltaic system and a method for photovoltaic string control in the MLPE photovoltaic system are provided according to embodiments of the present disclosure, so as to protect MLPE device(s) in the MLPE photovoltaic system.

To achieve the above objectives, the following technical solutions are provided according to the embodiments of the present disclosure.

A method for photovoltaic string control in a MLPE photovoltaic system is provided according to a first aspect of the present disclosure. The method is applied to a control unit in the MLPE photovoltaic system. The method for photovoltaic string control in a MLPE photovoltaic system includes:

detecting an output current of each photovoltaic string in the MLPE photovoltaic system; and controlling, for photovoltaic strings connected in parallel to a same inverter in the MLPE photovoltaic system, a voltage of a photovoltaic string with a larger output current to be reduced, or controlling a voltage of a photovoltaic string with a smaller output current to be increased, to reduce a backflow current to a preset range.

In an embodiment, if the inverter has an output power, the controlling a voltage of a photovoltaic string with a larger output current to be reduced includes: reducing a direct-current voltage of an input end of the inverter by controlling a current of the input end of the inverter.

In an embodiment, after the backflow current is reduced to the preset range, the method further includes: controlling the current of the input end of the inverter, to cause each of the photovoltaic strings to achieve a maximum power point tracking in a case that the backflow current is within the preset range.

In an embodiment, if a MLPE device in the photovoltaic string is a device with a controllable output state, the controlling a voltage of a photovoltaic string with a larger output current to be reduced includes: controlling at least one MLPE device in the photovoltaic string with a larger output current to be in an output-limited state.

In an embodiment, an output state of the MLPE device includes a normal output state and the output-limited state, and the output-limited state is an output-stopped state.

In an embodiment, after the backflow current is reduced to the preset range, the method further includes: dynamically adjusting the number of the MLPE devices being in the output-limited state.

In an embodiment, if a MLPE device in the photovoltaic string is a device with a controllable output voltage, the controlling a voltage of a photovoltaic string with a larger output current to be reduced includes: controlling at least one MLPE device in the photovoltaic string with a larger output current to be in a buck operation state.

In an embodiment, if a MLPE device in the photovoltaic string is a device with a controllable output voltage, the controlling a voltage of a photovoltaic string with a smaller output current to be increased includes: controlling at least one MLPE device in the photovoltaic string with a smaller output current to be in a boost operation state.

In an embodiment, after detecting an output current of each photovoltaic string in the MLPE photovoltaic system, the method further includes: determining whether the MLPE photovoltaic system has unbalanced string currents; and performing, if it is determined that the MLPE photovoltaic system has unbalanced string currents, the controlling, for photovoltaic strings connected in parallel to a same inverter in the MLPE photovoltaic system, a voltage of a photovoltaic string with a larger output current to be reduced, or controlling a voltage of a photovoltaic string with a smaller output current to be increased, to reduce a backflow current to a preset range.

In an embodiment, the determining whether the MLPE photovoltaic system has unbalanced string currents includes: determining whether output currents of the photovoltaic strings connected in parallel to a same inverter are not exactly the same according to the output currents of the photovoltaic strings.

In an embodiment, after determining whether output currents of the photovoltaic strings connected in parallel to a same inverter are not exactly the same, the method further includes: determining, in a case that the output currents of the photovoltaic strings connected in parallel to the same inverter are not exactly the same, whether the backflow current flowing into the photovoltaic string with a smaller output current is greater than a maximum backflow current that the MLPE device in the photovoltaic string can withstand.

In an embodiment, the preset range is less than or equal to a maximum backflow current that each MLPE device in the MLPE photovoltaic system can withstand.

A module level power electronics (MLPE) photovoltaic system is provided according to a second aspect of the present disclosure. The MLPE photovoltaic system includes a control unit, at least one inverter and at least two photovoltaic strings. A direct-current bus of the inverter is connected in parallel with at least two photovoltaic strings. Each of the at least two photovoltaic strings comprises at least one photovoltaic branch, an output end of each photovoltaic branch is connected in series between two poles of an output end of a photovoltaic string where the photovoltaic branch is located. The photovoltaic branch comprises a MLPE device and at least one photovoltaic module connected with an input end of the MLPE device. The control unit communicates with each MLPE device and is configured to perform the method for photovoltaic string control in a MLPE photovoltaic system described above.

In an embodiment, the MLPE device is a shutdown device or an optimizer.

In an embodiment, the control unit is a controller in the inverter.

In an embodiment, the control unit is a system controller of the MLPE photovoltaic system.

In an embodiment, the control unit is an independent controller on the direct-current bus in the MLPE photovoltaic system.

The method for photovoltaic string control in a MLPE photovoltaic system according to the above embodiments of the present disclosure is applied to a control unit in the MLPE photovoltaic system. The control unit first detects an output current of each photovoltaic string in the MLPE photovoltaic system, and then controls, for photovoltaic strings connected in parallel to a same inverter in the MLPE photovoltaic system, a voltage of a photovoltaic string with a larger output current to be reduced, or controls a voltage of a photovoltaic string with a smaller output current to be increased, so that a backflow current can be reduced to a preset range that each MLPE device in the MLPE photovoltaic system can withstand. It can be seen that the method for photovoltaic string control according to the embodiments of the present disclosure is from a perspective of the MLPE photovoltaic system, the backflow current is limited by controlling voltage change of associated photovoltaic string without additional hardware cost, effectively protecting the MLPE device in the MLPE photovoltaic system.

BRIEF DESCRIPTION OF THE DRAWINGS

In order to illustrate technical solutions in embodiments of the present disclosure or in the conventional technology more clearly, drawings to be used in the description of the embodiments or the conventional technology are briefly described hereinafter. Apparently, the drawings in the following description show only some embodiments of the present disclosure, and other drawings may be obtained by those skilled in the art from the drawings without any creative work.

DETAILED DESCRIPTION

The technical solutions in the embodiments of the present disclosure are clearly and completely described in conjunction with the drawings of the embodiments according to the present disclosure hereinafter. Apparently, the described embodiments are only some embodiments of the present disclosure, rather than all embodiments. Any other embodiments obtained by those skilled in the art based on the embodiments of the present disclosure without any creative work fall within the protection scope of the present disclosure.

In the present disclosure, the terms "comprise", "include", or any other variants thereof are intended to be non-exclusive, such that the process, method, article, or device including a series of elements includes not only those elements but also those elements that are not enumerated, or further includes elements that are inherent to such process, method, article, or device. Unless expressively limited, the statement "comprising (including) a . . . " does not exclude the case that other similar elements may exist in the process, the method, the article or the device including the enumerated elements.

Figure 2:
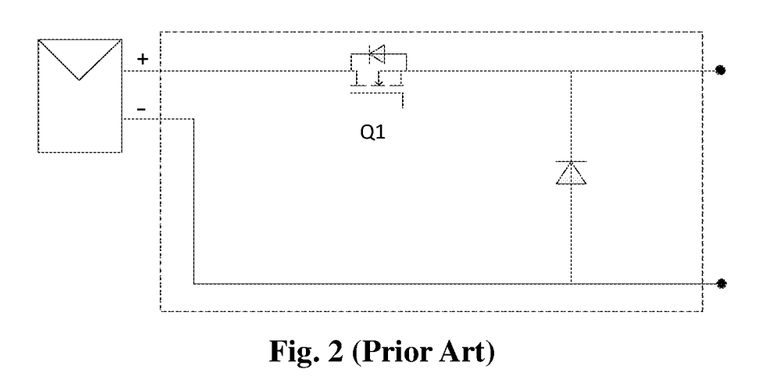
FIG. 2 is a schematic structural diagram of a MLPE device being a shutdown device according to the conventional technology.

In practices, a module level power electronics (MLPE) device in a MLPE photovoltaic system as shown in FIG. 1 may be a shutdown device or an optimizer according to the conventional technology. The MLPE device has a weaker ability to withstand a backflow current. For example, if the MLPE device shown in FIG. 1 is the shutdown device, of which a schematic structural diagram is shown in FIG. 2, the backflow current flows into a corresponding photovoltaic module through a bypass diode of a semiconductor switching device (shown as Q1 in FIG. 2). The bypass diode commonly has a weaker ability to withstand a current, and thus the bypass diode is prone to be damaged by the backflow current.

Therefore, a method for photovoltaic string control in a MLPE photovoltaic system is provided according to an embodiment of the present disclosure, to protect a MLPE device in the MLPE photovoltaic system.

Figure 3:
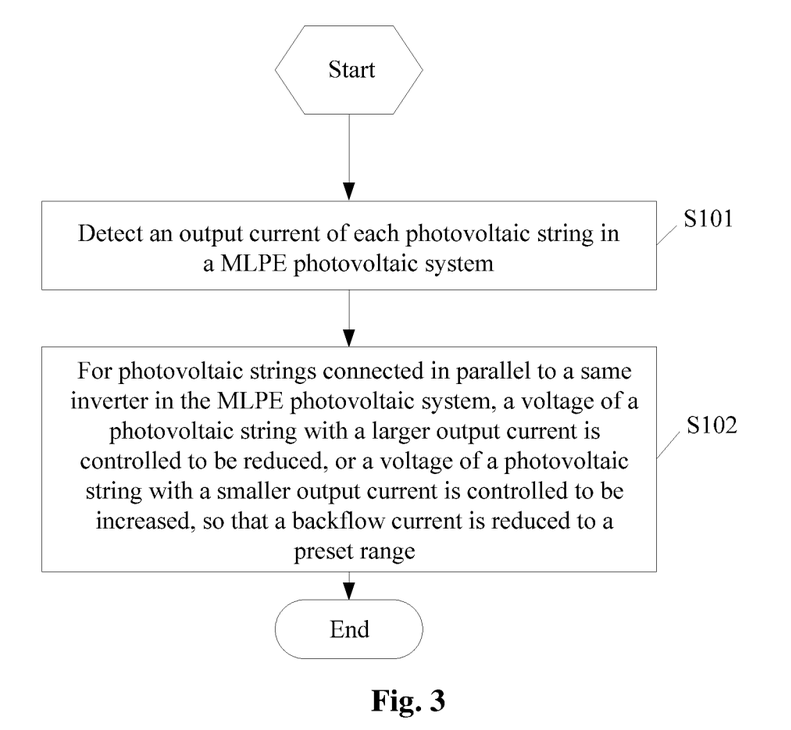
FIG. 3 is a flow chart of a method for photovoltaic string control in a MLPE photovoltaic system according to an embodiment of the present disclosure.
Figure 11:
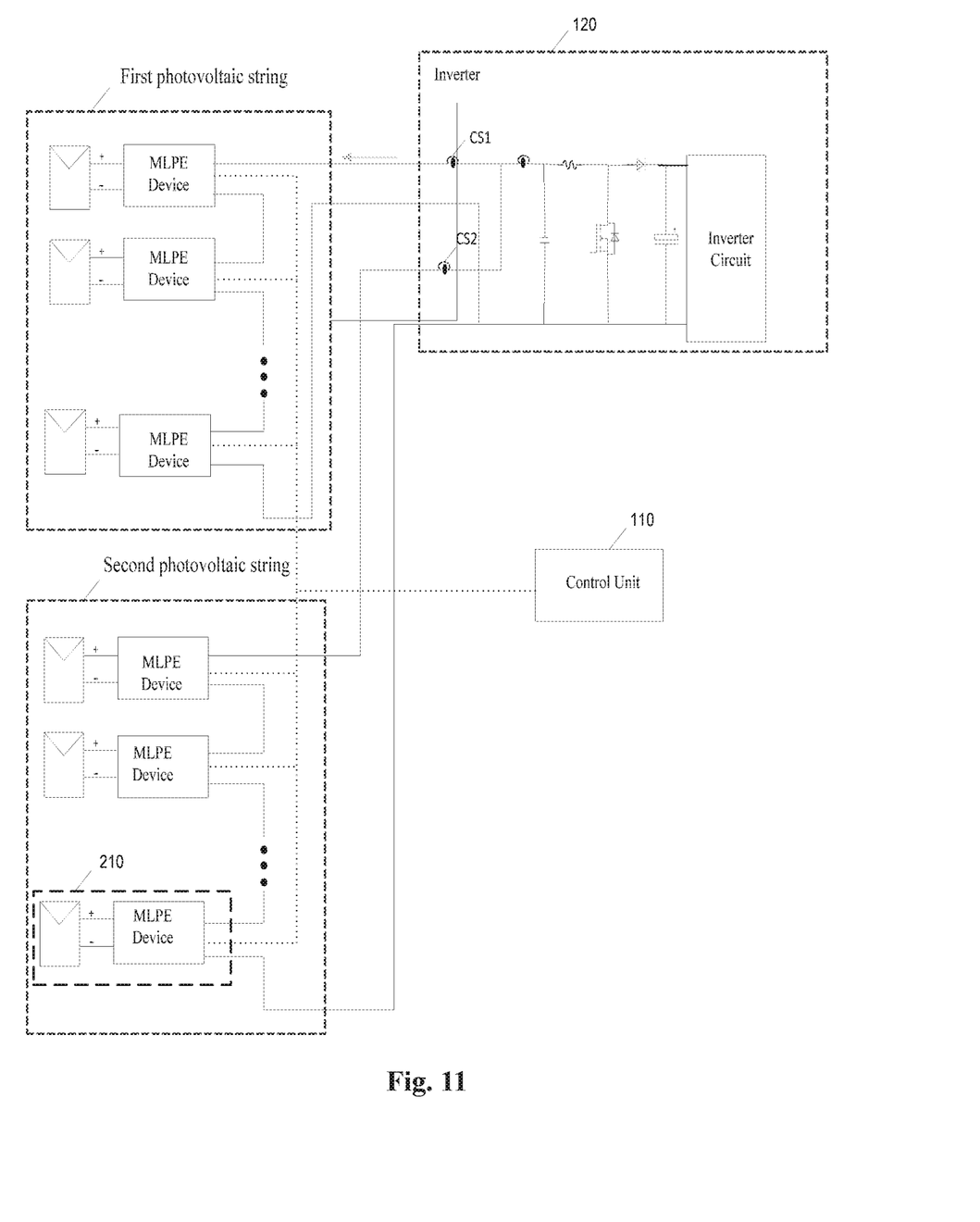
FIG. 11 is a schematic structural diagram of a MLPE photovoltaic system according to another embodiment of the present disclosure.

As shown in FIG. 11, the MLPE photovoltaic system includes a control unit 110, at least one inverter 120 and at least two photovoltaic strings. A direct-current bus of each inverter 120 is connected in parallel with the at least two photovoltaic strings (that is, a first photovoltaic string and a second photovoltaic string as shown in FIG. 11). Each of the at least two photovoltaic strings includes at least one photovoltaic branch. An output end of each photovoltaic branch is connected in series between two poles of an output end of a photovoltaic string where the photovoltaic branch is located. The photovoltaic branch includes a MLPE device and at least one photovoltaic module (indicated as 210 in FIG. 110) connected with an input end of the MLPE device. The control unit 110 communicates with each MLPE device and is configured to perform the method for photovoltaic string control in the MLPE photovoltaic system. A flow chart of the method for photovoltaic string control is shown in FIG. 3. The method includes the following steps S101 and S102.

In step S101, an output current of each photovoltaic string in the MLPE photovoltaic system is detected.

In practices, in order to monitor each photovoltaic string to achieve IV curve scanning, an inverter in the MLPE photovoltaic system usually samples an output current of each photovoltaic string separately through current sampling units, such as CS1 and CS2 shown in FIG. 11, so that this step can be implemented without any additional hardware device. However, in a case that the inverter cannot detect the output current of each photovoltaic string separately, an additional current detection device is required to detect the output current of each photovoltaic string in the MLPE photovoltaic system.

In step S102, for photovoltaic strings connected in parallel to a same inverter in the MLPE photovoltaic system, a voltage of a photovoltaic string with a larger output current is controlled to be reduced, or a voltage of a photovoltaic string with a smaller output current is controlled to be increased, so that a backflow current can be reduced to a preset range.

The preset range is less than or equal to a maximum backflow current that each MLPE device in the MLPE photovoltaic system can withstand.

Under normal conditions, since output ends of multiple photovoltaic strings connected to a same inverter are connected in parallel with each other, output currents of multiple photovoltaic strings connected in parallel to the same inverter are consistent with each other or tend to be consistent with each other. However, in a case that some of the multiple photovoltaic strings are in an abnormal operation state, such as, being covered by shadow, being failed, or a shutdown device or an optimizer corresponding to a photovoltaic string operating in an output-limited state, an output current of a photovoltaic string in a normal operation state is greater than an output current of the photovoltaic string in the abnormal operation state. Therefore, the photovoltaic string in the normal operation state generates a backflow current to flow into the photovoltaic string in the abnormal operation state, resulting in damage to the MLPE device(s) in the photovoltaic string in the abnormal operation state. Alternative, in a case that the output current of the photovoltaic string in the abnormal operation state is greater than the output current of the photovoltaic string in the normal operation state, the photovoltaic string in the normal operation state in the photovoltaic system may encounter the backflow current, resulting in damage to the MLPE device(s) in the photovoltaic string in the normal operation state. That is, any photovoltaic string with a lower output current may encounter the backflow current, affecting safety of the MLPE device(s) in the photovoltaic string. It should be noted that any circulation or countercurrent phenomenon that can generate the backflow current flowing into the photovoltaic string may cause the above situation and is applicable for the method for photovoltaic string control in the MLPE photovoltaic system according to the present disclosure, which falls within the protection scope of the present disclosure and is not described in detail.

Figure 4:
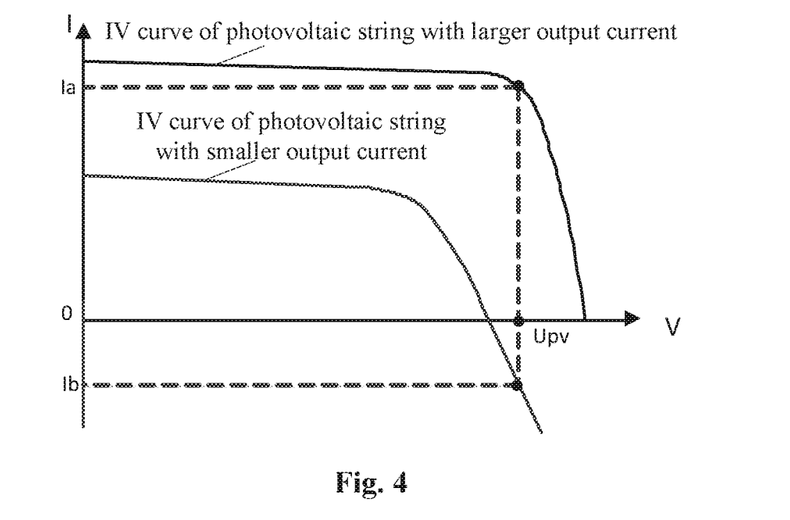
FIG. 4 is a diagram showing IV curves of a photovoltaic string with a larger output current and a photovoltaic string with a smaller output current in a method for photovoltaic string control in a MLPE photovoltaic system according to an embodiment of the present disclosure.

Assuming that IV curves of a photovoltaic string with a larger output current and a photovoltaic string with a smaller output current are as those shown in FIG. 4, when an output voltage of the photovoltaic strings is Upv, a current of the photovoltaic string with a smaller output current is a backflow current Ib, and a current of the photovoltaic string with a larger output current is Ia, the inverter controls an input current of the inverter to be Ia-Ib, to cause the output voltage of the photovoltaic strings to be Upv. That is, the voltage of the photovoltaic string with a larger output current is controlled to be reduced, or the voltage of the photovoltaic string with a smaller output current is controlled to be increased, so that the backflow current can be reduced.

Figure 5:
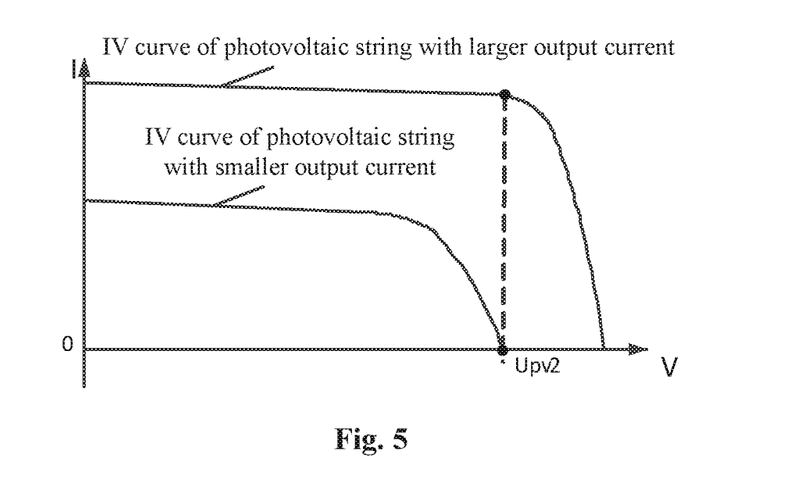
FIG. 5 is a diagram showing IV curves of a photovoltaic string with a larger output current and a photovoltaic string with a smaller output current after a voltage of the photovoltaic string with a larger output current is controlled to be reduced in a method for photovoltaic string control in a MLPE photovoltaic system according to an embodiment of the present disclosure.

For example, after the voltage of the photovoltaic string with a larger output current is controlled to be reduced, the IV curve of the photovoltaic string with a larger output current and the photovoltaic string with a smaller output current among photovoltaic strings connected in parallel to a same inverter in the MLPE photovoltaic system are as those shown in FIG. 5. It can be seen that when the voltage of the photovoltaic string with a larger output current is reduced to Upv2, the output current of the photovoltaic string with a smaller output current is zero, that is, the photovoltaic string with a smaller output current has no backflow current. However, in order to reduce loss of power generation, the voltage of the photovoltaic string with a larger output current is controlled to be less than or equal to Upv shown in FIG. 4, in such case, the backflow current is within the preset range, and the MLPE device in the MLPE photovoltaic system may not be damaged.

The method for photovoltaic string control in a MLPE photovoltaic system according to the embodiment of the present disclosure is applied to a control unit in the MLPE photovoltaic system. The control unit first detects an output current of each photovoltaic string in the MLPE photovoltaic system, and then controls, for photovoltaic strings connected in parallel to a same inverter in the MLPE photovoltaic system, a voltage of a photovoltaic string with a larger output current to be reduced, or controls a voltage of a photovoltaic string with a smaller output current to be increased, so that a backflow current can be reduced to a preset range that each MLPE device in the MLPE photovoltaic system can withstand. It can be seen that the method for photovoltaic string control according to the embodiment of the present disclosure is from a perspective of the MLPE photovoltaic system, the backflow current is limited by controlling a voltage change of an associated photovoltaic string without additional hardware cost, thereby effectively protecting the MLPE device(s) in the MLPE photovoltaic system.

Figure 6:
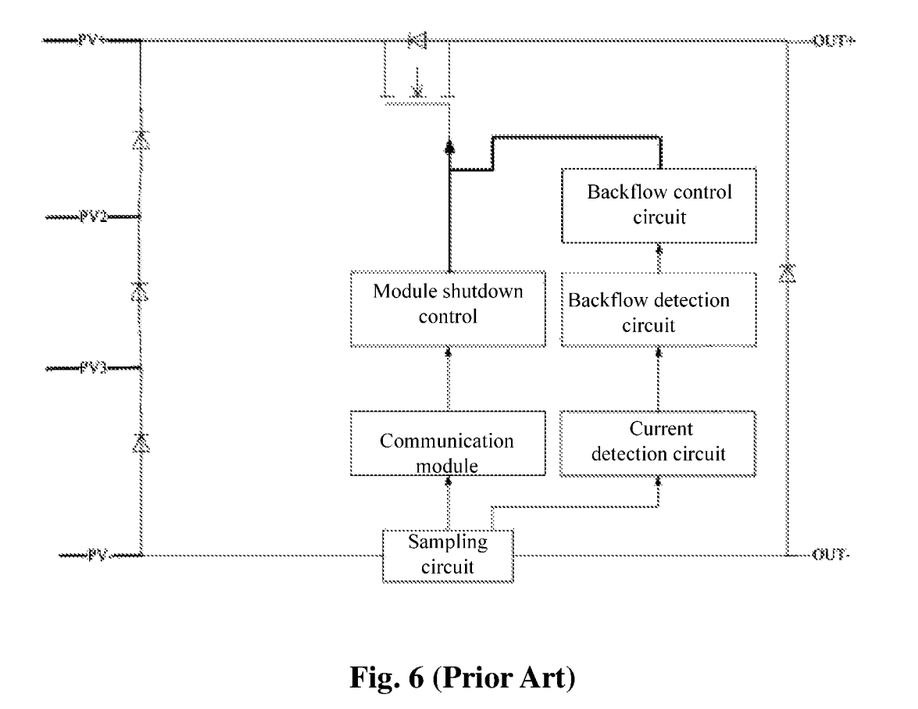
FIG. 6 is a schematic structural diagram of a photovoltaic module shutdown protection circuit for improving an ability of a MLPE device to withstand a backflow current according to the conventional technology.

It should be noted that in view of the problem that the MLPE device is prone to be damaged due to the influence of the backflow current, a method is provided according to the conventional technology. In the method, activation of a switching device is controlled by detecting the backflow current, so as to improve the ability of the MLPE device to withstand the backflow current. A schematic structural diagram of a photovoltaic module shutdown protection circuit in the method is shown in FIG. 6. It can be seen from FIG. 6 that the photovoltaic module shutdown protection circuit is provided with a series of hardware circuits such as a sampling circuit, a current detection circuit, a backflow detection circuit and a backflow control circuit, resulting in a complex system and a high hardware cost. By contrast, the method for photovoltaic string control in a MLPE photovoltaic system according to the embodiment requires no additional hardware circuit, or in only a few cases a current detection hardware device is additionally required. Therefore, compared with the conventional technology, the system involved in the method according to the present disclosure has a simple structure and a low cost.

A method for photovoltaic string control in a MLPE photovoltaic system is further provided according to another embodiment of the present disclosure. Based on the above embodiment, the process of controlling, for photovoltaic strings connected in parallel to a same inverter in the MLPE photovoltaic system, according to the detected the output current of each of the photovoltaic strings in the MLPE photovoltaic system, a voltage of a photovoltaic string with a larger output current to be reduced, or controlling a voltage of a photovoltaic string with a smaller output current to be increased, to reduce a backflow current to a preset range includes the following two method.

Figure 7:
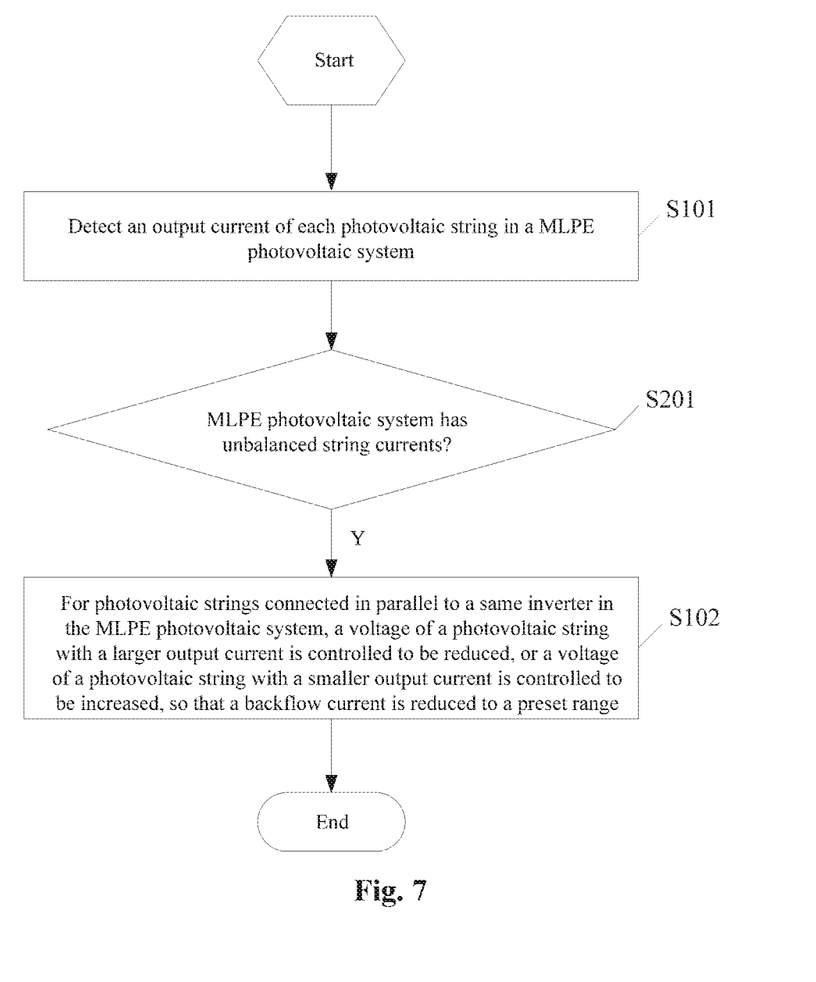
FIG. 7 is a flow chart of a method for photovoltaic string control in a MLPE photovoltaic system according to another embodiment of the present disclosure.

A flow chart of a first method is shown in FIG. 7. After performing step S101, the first method further includes the following step S201.

In step S201, it is determined whether the MLPE photovoltaic system has unbalanced string currents.

As described in the above embodiment, assuming that among the photovoltaic strings connected in parallel to a same inverter in the MLPE photovoltaic system, there is a photovoltaic string with a larger output current and a photovoltaic string with a smaller output current, of which the IV curves are shown in FIG. 4. Apparently, before the backflow current generated by the photovoltaic string with a larger output current flows into the photovoltaic string with a smaller output current, the output current of the photovoltaic string with a smaller output current is significantly lower than the output current of the photovoltaic string with a larger output current; in a word, the MLPE photovoltaic system has unbalanced string currents, that is, the output currents of the photovoltaic strings connected in parallel to a same inverter in the MLPE photovoltaic system are not exactly the same.

Once it is determined that the MLPE photovoltaic system has unbalanced string currents, step S102 performed.

Figure 8:
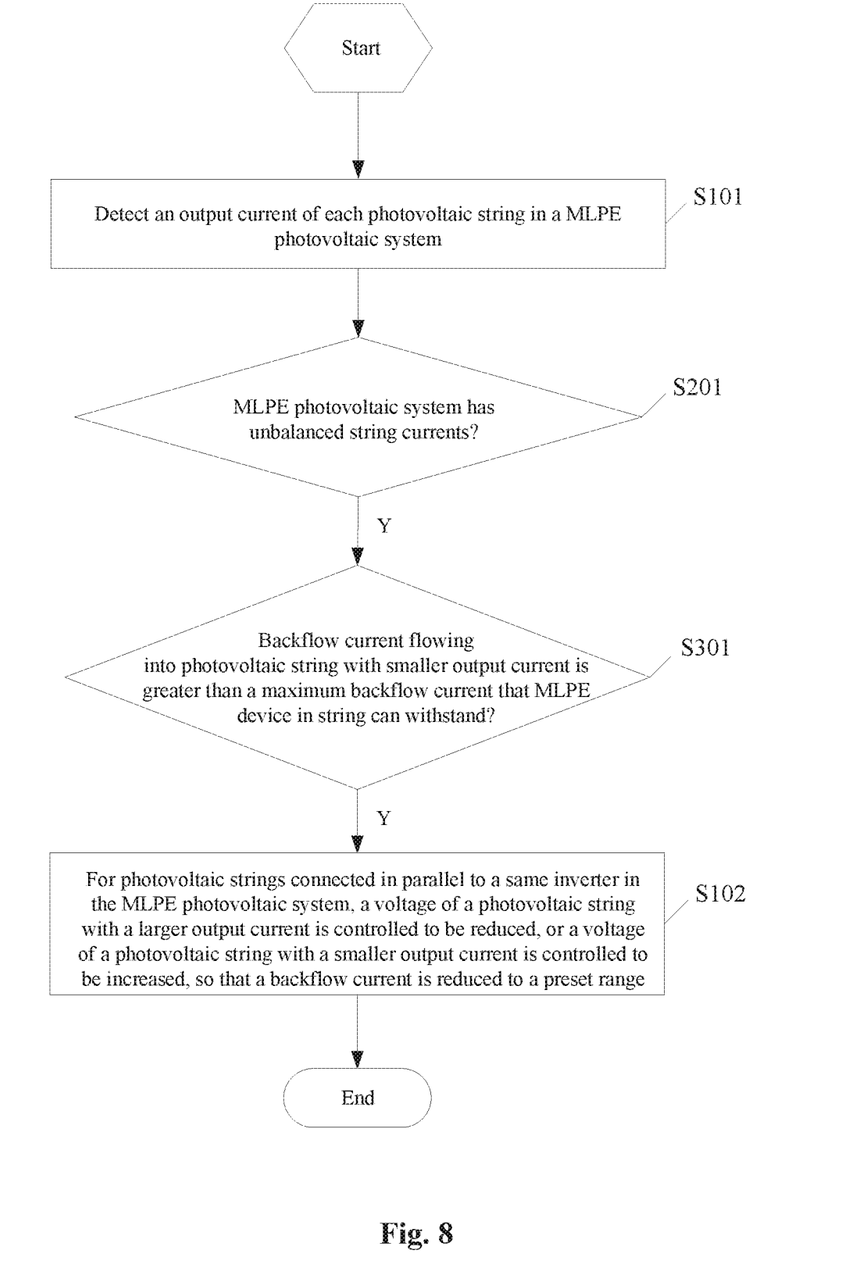
FIG. 8 is a flow chart of a method for photovoltaic string control in a MLPE photovoltaic system according to another embodiment of the present disclosure.

In an embodiment, in order to reduce the loss of power generation, a second method is performed. A flow chart of the method is shown in FIG. 8. After determining that output currents of the photovoltaic strings connected in parallel to a same inverter in the MLPE photovoltaic system are not exactly the same, the second method further includes the following step S301.

In step S301, it is determined whether the backflow current flowing into the photovoltaic string with a smaller output current is greater than a maximum backflow current that the MLPE device in the photovoltaic string can withstand.

As shown in FIG. 4, when the output voltage of the photovoltaic strings is Upv, a current of the photovoltaic string with a smaller output current is a backflow current Ib. Assuming that the maximum backflow current that each MLPE device in the MLPE photovoltaic system can withstand is Ib, it is determined that the backflow current flowing from the photovoltaic string with a larger output current into the photovoltaic string with a smaller output current exceeds the maximum backflow current that each MLPE device in the MLPE photovoltaic system can withstand, that is, in a case that the reverse output current of the photovoltaic string with a smaller output current is greater than or equal to Ib, it is determined that the backflow current flowing into the photovoltaic string with a smaller output current exceeds the maximum backflow current that the MLPE device can withstand, and step S102 is performed.

The principles for remaining parts are the same as the principles described in the above embodiments, which are not repeated herein.

A method for photovoltaic string control in a MLPE photovoltaic system is further provided according to another embodiment of the present disclosure. Based on the above embodiment, the voltage of the photovoltaic string with a larger output current is controlled to be reduced by the following ways.

In a first way, if the inverter has an output power, a current at an input end of the inverter is controlled to reduce a direct-current voltage at the input end of the inverter, thereby reducing the voltage of the photovoltaic string with a larger output current. As shown in FIG. 4, the current at the input end of the inverter is controlled to be less than or equal to Ia-Ib, to cause the direct-current voltage at the input end of the inverter to be less than or equal to Upv, so that the backflow current flowing into the photovoltaic string with a smaller output current is lower than the maximum backflow current that each MLPE device can withstand or there is no backflow current flowing into the photovoltaic string with a smaller output current.

It should be noted that in a case that the voltage of the photovoltaic string with a larger output current is reduced by the first way described above, in order to ensure that the backflow current is within the preset range, each of the photovoltaic strings is controlled to output a highest power, and the current at the input end of the inverter is also controlled to enable each of the photovoltaic strings to achieve a maximum power point tracking in a case that the backflow current is within the preset range.

In a second way, if the MLPE device(s) in the photovoltaic string is a device with a controllable output state, at least one MLPE device in the photovoltaic string with a larger output current is controlled to be in the output-limited state to reduce the voltage of the photovoltaic string with a larger output current. A MLPE device may be in a normal output state or in the output-limited state; and when a MLPE device is in the output-limited state, the output of the MLPE device is stopped. For example, in a case that the MLPE device in the MLPE photovoltaic system is the shutdown device shown in FIG. 2, the semiconductor switching device Q1 may be turned off to cause the shutdown device to enter into the output-limited state. Alternatively, if the MLPE device in the MLPE photovoltaic system is the optimizer shown in FIG. 9, the semiconductor switching device Q2 may be turned off to cause the optimizer to enter into the output-limited state.

In an embodiment, in addition to reducing the voltage of the photovoltaic string with a larger output current by the second way described above and in turn reducing the backflow current to the preset range, the number of the MLPE devices being in the output-limited state may be dynamically adjusted. Therefore, on the premise that the backflow current is within the preset range, there are as few MLPE devices in the output-limited state as possible, so as to reduce the loss of system power generation. For example, 1 to N MLPE devices are controlled to be in the output-limited state sequentially, until the backflow current flowing into the photovoltaic string with a smaller output current is within the preset range when the N MLPE devices are controlled to be in the output-limited state.

In a third way, if the MLPE device(s) in the photovoltaic string is a device with a controllable output voltage, at least one MLPE device in the photovoltaic string with a larger output current is controlled to be in a buck operation state to reduce the voltage of the photovoltaic string with a larger output current. As for a MLPE device with controllable output voltage, the system can control the MLPE device to be in the buck operation state or in a boost operation state. For example, in a case that the MLPE device is the optimizer shown in FIG. 10, the optimizer may enter into the buck operation state by turning off the semiconductor switching devices Q10 and Q11, so that an output voltage of the MLPE device is lower than an input voltage of the MLPE device. Similarly, the number of the MLPE devices being in the buck operation state is dynamically adjusted, which may be determined by technicians according to the specific situation.

It is should be noted that if the MLPE device(s) in the photovoltaic string is a device with a controllable output voltage, at least one MLPE device in the photovoltaic string with a smaller output current may be controlled to be in the boost operation state, to increase the voltage of the photovoltaic string with a smaller output current among the photovoltaic strings connected in parallel to the inverter in the MLPE photovoltaic system. For example, if the MLPE device is the optimizer shown in FIG. 9, the semiconductor switching device Q2 may be maintained in a turned-on state, the semiconductor switching device Q3 may be turned off, the semiconductor switching device Q4 may be turned off, and the semiconductor switch Q5 may be controlled to operate in a PWM mode, so that the optimizer operates as a boost circuit and is in the boost operation state.

In the method for photovoltaic string control in a MLPE photovoltaic system according to the embodiment of the present disclosure, for the photovoltaic strings connected in parallel to a same inverter in the MLPE photovoltaic system, a voltage of a photovoltaic string with a larger output current is controlled to be reduced, or a voltage of a photovoltaic string with a smaller output current is controlled to be increased. Both of the implementations are from a perspective of the MLPE photovoltaic system, cause no additional hardware cost, and may be achieved in various flexible manners.

The principles for remaining parts are the same as the principles described in the above embodiments, which are not repeated herein.

A MLPE photovoltaic system is further provided according to an embodiment of the present disclosure, and a schematic structural diagram of the MLPE photovoltaic system is shown in FIG. 11. The MLPE photovoltaic system includes a control unit 110, at least one inverter 120 and at least two photovoltaic strings. The embodiment is illustrated by taking the case of two photovoltaic strings as an example, and a structure of multiple photovoltaic strings is similar.

A direct-current bus of the inverter 120 is connected in parallel with at least two photovoltaic strings (that is, a first photovoltaic string and a second photovoltaic string as shown in FIG. 11). Each of the at least two photovoltaic strings includes at least one photovoltaic branch. For each photovoltaic branch, an output end of the photovoltaic branch is connected in series between two poles of an output end of a photovoltaic string where the photovoltaic branch is located, and the photovoltaic branch includes a MLPE device and at least one photovoltaic module (indicated as 210 in FIG. 110) connected with an input end of the MLPE device. The control unit 110 communicates with each MLPE device and is configured to perform the method for photovoltaic string control in a MLPE photovoltaic system according to any one of the above embodiments.

In practices, the control unit 110 is connected with each MLPE device through wired communication or wireless communication.

Figure 9:
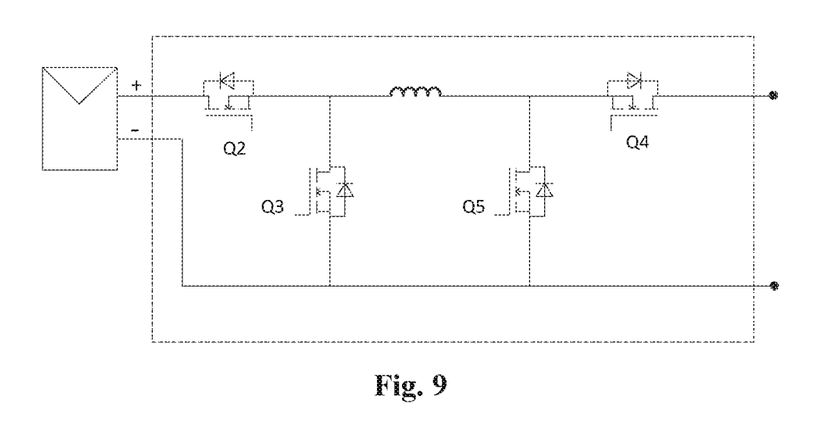
FIG. 9 is a schematic structural diagram in which a MLPE device in a method for photovoltaic string control in a MLPE photovoltaic system is an optimizer according to another embodiment of the present disclosure.
Figure 10:
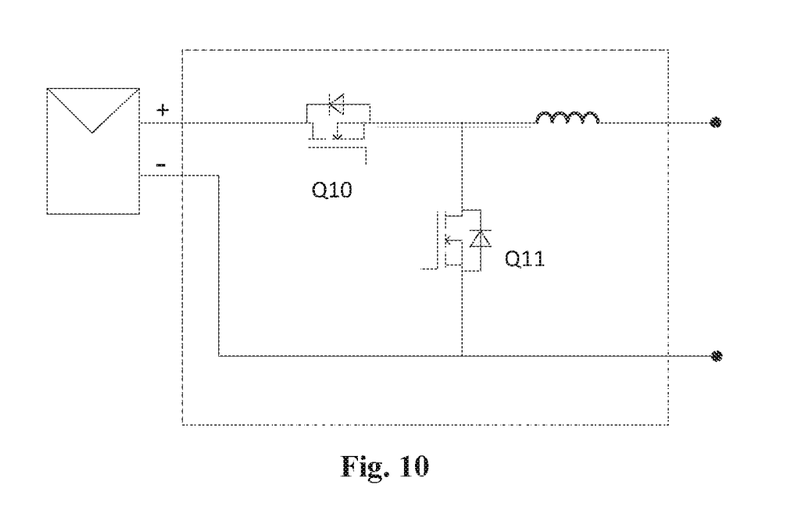
FIG. 10 is a schematic structural diagram in which a MLPE device in a method for photovoltaic string control in a MLPE photovoltaic system is another optimizer according to another embodiment of the present disclosure.

It should be noted that the MLPE device according to the embodiment of the present disclosure may be a shutdown device or an optimizer (as shown in FIG. 2, FIG. 9 and FIG. 10). The control unit 110 is a controller in the inverter 120, a system controller of the MLPE photovoltaic system or any one of independent controllers on direct-current buses in the MLPE photovoltaic system. The control unit 110 is not limited herein, which depends on the actual application and all fall within the protection scope of the present disclosure.

The principles for remaining parts are the same as the principles described in the above embodiments, which are not repeated herein.

The embodiments of the present disclosure are described in a progressive manner, the same or similar parts among the embodiments can be referred to each other, and each embodiment emphasizes the difference from other embodiments. In particular, for the system or the embodiment of the system, since they are similar to the embodiment of the method, the description of the system or the embodiment of the system is relatively simple, and for relevant matters references may be made to the description of the embodiment of the method. The above-described system and the embodiments of the system are only schematic. Units described as separated components may be or be not physically separated. Components shown as units may be or may be not physical units, i.e. the components may be centralized or may be distributed onto multiple network units. The object of the solution of the embodiment may be achieved by selecting some or all of the units according to the actual requirements. Those skilled in the art may understand and implement the embodiments without any creative work.

Those skilled in the art can further understand that units and algorithm steps described in combination with the disclosed embodiments may be implemented by electronic hardware, computer software or a combination thereof. In order to clearly describe interchangeability of the hardware and the software, configurations and steps are generally described above based on functions. Determination regarding implementing the functions by the hardware or the software may depend on specific applications of the technical solutions and design constraints. For each of the specific applications, those skilled in the art may adopt a specific implementation to implement the functions described above, and the implementation should fall within the scope of the present disclosure.

Based on the above description of the disclosed embodiments, the features described in the different embodiments according to the present disclosure may be replaced or combined with each other to facilitate implementing or carrying out the present disclosure by those skilled in the art. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A method for photovoltaic string control in a module level power electronics (MLPE) photovoltaic system, the method being applicable to a control unit in the MLPE photovoltaic system, and the method comprising:
   detecting an output current of each photovoltaic string in the MLPE photovoltaic system;
   determining whether the MLPE photovoltaic system has unbalanced string currents; and
   if it is determined that the MLPE photovoltaic system has unbalanced string currents, controlling, for photovoltaic strings connected in parallel to a same inverter in the MLPE photovoltaic system, a voltage of a photovoltaic string with a larger output current to be reduced, or controlling a voltage of a photovoltaic string with a smaller output current to be increased, to reduce a backflow current to a preset range, wherein the backflow current is a current that is generated by the photovoltaic string with the larger output current and flows into the photovoltaic string with the smaller output current,
   wherein the inverter samples the output current of each photovoltaic string separately.

2. The method for photovoltaic string control in the MLPE photovoltaic system according to claim 1, wherein if the inverter has an output power, the controlling the voltage of the photovoltaic string with the larger output current to be reduced comprises:
   reducing a direct-current voltage of an input end of the inverter by controlling a current of the input end of the inverter.

3. The method for photovoltaic string control in the MLPE photovoltaic system according to claim 2, wherein after the backflow current is reduced to the preset range, the method further comprises:
   controlling the current of the input end of the inverter, to achieve a maximum power point tracking for each of the photovoltaic strings in a case that the backflow current is within the preset range.

4. The method for photovoltaic string control in the MLPE photovoltaic system according to claim 1, wherein if a MLPE device in the photovoltaic string is a device with a controllable output state, the controlling the voltage of the photovoltaic string with the larger output current to be reduced comprises:
   controlling at least one MLPE device in the photovoltaic string with the larger output current to be in an output-limited state.

5. The method for photovoltaic string control in the MLPE photovoltaic system according to claim 4, wherein
   an output state of the MLPE device comprises a normal output state and the output-limited state, and the output-limited state is an output-stopped state.

6. The method for photovoltaic string control in the MLPE photovoltaic system according to claim 4, wherein after the backflow current is reduced to the preset range, the method further comprises:
   dynamically adjusting the number of the MLPE devices being in the output-limited state.

7. The method for photovoltaic string control in the MLPE photovoltaic system according to claim 1, wherein if a MLPE device in the photovoltaic string is a device with a controllable output voltage, the controlling a voltage of a photovoltaic string with a larger output current to be reduced comprises:
   controlling at least one MLPE device in the photovoltaic string with the larger output current to be in a buck operation state.

8. The method for photovoltaic string control in the MLPE photovoltaic system according to claim 1, wherein if a MLPE device in the photovoltaic string is a device with a controllable output voltage, the controlling a voltage of a photovoltaic string with a smaller output current to be increased comprises:
   controlling at least one MLPE device in the photovoltaic string with the smaller output current to be in a boost operation state.

9. The method for photovoltaic string control in the MLPE photovoltaic system according to claim 1, wherein the determining whether the MLPE photovoltaic system has unbalanced string currents comprises:
   determining whether output currents of the photovoltaic strings connected in parallel to the same inverter are not exactly the same according to the output currents of the photovoltaic strings.

10. The method for photovoltaic string control in the MLPE photovoltaic system according to claim 9, wherein after determining whether output currents of the photovoltaic strings connected in parallel to the same inverter are not exactly the same, the method further comprises:
    determining, in a case that the output currents of the photovoltaic strings connected in parallel to the same inverter are not exactly the same, whether the backflow current flowing into the photovoltaic string with the smaller output current is greater than a maximum backflow current that the MLPE device in the photovoltaic string capable of withstanding.

11. The method for photovoltaic string control in the MLPE photovoltaic system according to claim 1, wherein
    the preset range is less than or equal to a maximum backflow current that each MLPE device in the MLPE photovoltaic system capable of withstanding.

12. A module level power electronics (MLPE) photovoltaic system comprising a control unit, at least one inverter and at least two photovoltaic strings, wherein:
- a direct-current bus of the inverter is connected in parallel with the at least two photovoltaic strings;
- each of the at least two photovoltaic strings comprises at least one photovoltaic branch, an output end of each photovoltaic branch is connected in series between two poles of an output end of a photovoltaic string where the photovoltaic branch is located;
- the photovoltaic branch comprises a MLPE device and at least one photovoltaic module connected with an input end of the MLPE device; and
- the control unit communicates with each MLPE device and is configured for:
  - detecting an output current of each photovoltaic string in the MLPE photovoltaic system;
  - determining whether the MLPE photovoltaic system has unbalanced string currents; and
  - if it is determined that the MLPE photovoltaic system has unbalanced string currents, controlling, for photovoltaic strings connected in parallel to a same inverter in the MLPE photovoltaic system, a voltage of a photovoltaic string with a larger output current to be reduced, or controlling a voltage of a photovoltaic string with a smaller output current to be increased, to reduce a backflow current to a preset range, wherein the backflow current is a current that is generated by the photovoltaic string with the larger output current and flows into the photovoltaic string with the smaller output current,
  - wherein the inverter samples the output current of each photovoltaic string separately.

13. The MLPE photovoltaic system according to claim 12, wherein the MLPE device is a shutdown device or an optimizer.

14. The MLPE photovoltaic system according to claim 12, wherein the control unit is a controller in the inverter.

15. The MLPE photovoltaic system according to claim 12, wherein the control unit is a system controller of the MLPE photovoltaic system.

16. The MLPE photovoltaic system according to claim 12, wherein the control unit is an independent controller on the direct-current bus in the MLPE photovoltaic system.

* * * * *